United States Patent [19]

Spahn

[11] Patent Number: 5,534,385
[45] Date of Patent: Jul. 9, 1996

[54] OVERCOAT FOR OPTICAL TAPE HAVING SBINSN RECORDING LAYER

[75] Inventor: Robert G. Spahn, Webster, N.Y.

[73] Assignee: Eastman Kodak Company, Rochester, N.Y.

[21] Appl. No.: 416,105

[22] Filed: Apr. 4, 1995

[51] Int. Cl.$^6$ .................... G11B 7/24; G11B 7/26
[52] U.S. Cl. .................... 430/270.13; 430/272.1; 430/321; 430/945; 204/192.26; 369/284; 369/287
[58] Field of Search .................... 430/271, 272, 430/273, 321, 495, 945, 270.13; 369/284, 283, 287, 288; 204/192.26

[56] References Cited

U.S. PATENT DOCUMENTS 5,196,294  3/1993  Pan et al. .................... 430/270
5,271,978  12/1993  Vazan et al. .................... 428/64

FOREIGN PATENT DOCUMENTS 1-235051  9/1989  Japan .
5-047041  2/1993  Japan .

Primary Examiner—Janet C. Baxter
Assistant Examiner—John A. McPherson
Attorney, Agent, or Firm—J. Jeffrey Hawley

[57] ABSTRACT

There is disclosed a flexible optical recording element comprising a flexible support having thereon, in order, an SbInSn phase-change alloy optical recording layer and an overcoat layer, the overcoat layer being a silicon oxide layer having an index of refraction greater than about 1.8 at about 800 nm wavelength and a thickness of about $\lambda/4$, where $\lambda$ is the wavelength at which the element is read. The element of the invention provides for an advantageous optical tape with a well adhered abrasion resistant overcoat which also provides for excellent corrosion resistance.

4 Claims, No Drawings

OVERCOAT FOR OPTICAL TAPE HAVING SBINSN RECORDING LAYER

FIELD OF THE INVENTION

The present invention relates to optical recording elements and more specifically flexible digital optical tape.

BACKGROUND OF THE INVENTION

There is an increasing need for storage media with very high volumetric storage density, high information input rate capability, and stored information stability considered "archival". Optical tape promises to address all of these needs.

The competing technology, magnetic recording, does not yet meet the volumetric storage density needs which optical tape can provide now and is not perceived as archival at an acceptable level.

Attempts to make optical tape have typically evolved from efforts related to other optical storage elements, typically on rigid supports, such as optical cards or optical disks. Most of these elements have utilized dye layers to absorb light, with deformation or ablation of one or a sandwich of layers being the mechanism for changing the reflectance or transmittance to effect digital information storage. Others have utilized the deformation of metal or alloy layers or the flow of low melting point metals or alloys upon the absorption of optical energy. Still others rely on the rotation of the polarization of light from areas of a special alloy layer heated and cooled in the presence of appropriate magnetic fields (magnetooptic recording); or the change in phase of a metal or alloy from amorphous to crystalline or between crystalline phases upon local heating accompanied by a detectable change in the reflectance (or transmittance) from (or through) the areas of differing crystal phases.

The approaches involving the ablation or movement of material to form pits or deformed areas of differing reflectance have generally required the application of overcoats or encapsulation layers to contain the removed material or byproducts. This has resulted in reduced sensitivity and/or resolution (spot sharpness).

In Japanese Kokai JP04/163,736 assigned to Mitsubishi Kasei, there is disclosed an optical tape having a phase-change optical recording layer or a magnetooptic recording layer and further having a protective and interference and/or reflection layer.

One particularly advantageous optical recording material is the phase-change optical recording SbInSn alloys described in commonly assigned U.S. Pat. No. 4,904,577, 4,960,680 and 5,271,978. This material is characterized by having good writing sensitivity, good signal-to-noise ratio, wide wavelength response and good resolution. It has also been found to be compatible with coating on a flexible support needed for flexible digital optical tape. The recording material in the last mentioned patent, '978 patent include a dopant which improves the stability to mark change on storage and is the currently preferred material.

However, these materials are relatively soft alloys, thus, relatively prone to scratching. In many of the optical disk applications (non-flexible substrates) scratch resistance can be provided by applying relatively thick overcoats, laminates, or even coverplates spaced well away from the recording layer surface. In the case of flexible digital optical tape which is wound upon itself, the need for high volumetric storage density requires that the protective layer be thin, thus also requiring that it be an integral part of the optical-thin-film package. While a wide variety of materials have been suggested for other types of recording materials, it was not clear which overcoat candidates would have the necessary combination of adhesiveness to the phase-change SbInSn alloy, toughness, flexibility and other properties that are required.

One of the more difficult problems to overcome for this type of material is corrosion resistance since the materials are intended for archival keeping. One of the common tests that is used to determine the corrosion resistance is the Battelle Class II corrosion test. This is described, for example, in Br. Corros. J., 24 (2), p 153 (1989). In this test, a sample is exposed to an environment containing 70% relative humidity and a variety of corrosive gasses such as chlorine, hydrogen sulfide and nitrogen oxide at low concentrations. The test involves exposing the test sample to flowing gasses for extended periods. It is commonly assumed that the acceleration factor is about 180:1. Thus, 30 days in this test represents about 15 years of normal storage.

A wide variety of potential overcoats for this type of element are known. It is important that the overcoat provides all of the physical properties mentioned, e.g. adhesion, while at the same time, excellent corrosion resistance in the Battelle Class II test. It is to the solution of this problem that the present invention is directed.

SUMMARY OF THE INVENTION:

In accordance with the present invention, there is provided a flexible optical recording element comprising a flexible support having thereon, in order, an SbInSn phase-change alloy optical recording layer and an overcoat layer, the overcoat layer being a silicon oxide layer having an index of refraction greater than about 1.8 at about 800 nm wavelength and a thickness of about $\lambda/4$, where $\lambda$ is the wavelength at which the element is read. The index of refraction is preferably greater than about 1.9 at about 800 nm wavelength.

The thickness of the overcoat layer is chosen so as to optimize the optical properties of the element at the wavelength of the laser used for reading the digital information on the element while providing for good adhesion of the overcoat.

DETAILED DESCRIPTION OF THE INVENTION

This invention is a digital optical element, most commonly in the form of a tape, having, preferably formed by sputtering in vacuum, a SbInSn phase-change-alloy recording layer on an appropriate thin plastic base, such as poly(ethylene) terephthalate. In accordance with the invention, the recording layer has an overcoat of a layer of material of thickness such as to act as both an abrasion/scratch-resistant layer and, desirably, to meet particular optical criteria such as to serve as an antireflection layer. The thickness is chosen to increase the reflectance contrast of the two phases at the read wavelength. The optical criteria of interest will be determined by systems constraints such as read, write, and focus laser wavelengths, light level constraints of the detectors, systems noise sources and levels, etc. The overcoat thickness and optical properties may be varied over a range through choices of materials and deposition conditions to tailor this element to a particular system's requirements.

The optical element of the invention in the form of a tape retains or betters the high write sensitivity of the bare SbInSn phase-change alloy layer, shows abrasion and scratch resistance and exhibits good interlayer adhesion. The recording layer-overcoat combination shows good environmental stability, that is, it has good long term keeping characteristics in the unrecorded and recorded states. Many would consider the recorded element to be "archival". The corrosion resistance of the recording layer-overcoat combination is particularly good. In the Battelle Class II corrosion test, there has been no noticeable change after 102 days of free hanging exposure. Many other formulations become transparent and therefore useless after 30 days of such testing. These results are particularly good since many manufacturers report data from the Battelle Class II test for tape that is tightly wound. The free hanging test is dramatically more severe. As the comparative examples below illustrates, many potential overcoat materials result in tapes which are substantially transparent after 30 days.

It was surprising that materials could be found which provide for the performance we have found. While a set of potential materials can be determined from the AIP Handbook of Thin Films, thin film properties are not typically identical to bulk, and thus, it was not apparent whether any materials could be found having the correct set of properties.

The element of the present invention has an overcoat layer of silicon oxide that has an index of refraction greater than about 1.8 at about 800 nm wavelength. Index of refraction can be measured using conventional techniques such as VASE (variable angle spectral ellipsometry) or spectral reflectance measurement. In the latter case, one measures the reflectance of normally incident light at a quarter wave minimum and applies the well known Fresnel equations to calculate the index of refraction. This method of measurement requires knowledge of the optical properties of the substantially opaque underlying recording layer or the method becomes substantially more complex and time consuming.

The overcoat layer is a silicon oxide having the desired index of refraction. The silicon oxide can be represented by the formula $SiO_x$ wherein x varies over a range. As long as the final layer has the desired refractive index, the silicon oxide is considered to be within the scope of the invention.

The overcoat layer is preferably deposited by evaporation in a vacuum web coater, in-line with the deposition of the SbInSn alloy phase-change optical recording layer. In-line vacuum web coating machines are commercially available such as from Leybold Technologies Inc.; Airco Coating Technology Co.; General Vacuum Equipment Inc.; and Galileo Vacuum Systems Inc. The silicon monoxide deposition material is also commercially available and can be purchased, for example, from Cerac Inc.; EM Industries Inc.; and Kamis Inc. The overcoat can also be coated in a separate step and for some cases, where cost is not a significant factor, can be vacuum coated by sputter deposition, either in-line or as a second coating step. The adhesion of the overcoat to the alloy layer may also influence the decision to in-line or separate-pass coat these layers.

The SbInSn alloy recording layer is overcoated with an overcoat layer with optical properties such that the amorphous alloy layer-overcoat combination meets optical criteria related to a system's optical figure of merit, such as antireflection coating the unwritten element at the read wavelength. Generally speaking, antireflection coating the unwritten element at about the read wavelength will result in the maximum contrast between the unwritten and written material and significantly improve the system's read performance. This is the preferred optical figure of merit although others are also possible such as antireflection of the unwritten material at the wavelength of the write laser; maximizing the reflectance difference between the amorphous and crystalline phases of the recording layer at the wavelength of the read laser; or some other suitable figure of merit. This layer must also have mechanical abrasion resistance suitable to protect the alloy layer during the manufacturing steps and in normal use in typical tape transport systems.

The materials which meet these criteria and are substantially impervious to corrosion, are silicon oxide materials having an index of refraction greater than about 1.8 at about 800 nm wavelength. These materials adhere strongly to the SbInSn phase-change recording layer.

Most organics, $SiO_2$, and $Al_2O_3$ have indices of refraction less than 1.65 and antireflectance minima of over 20% reflectance for unwritten element. With the typical written to unwritten reflectance difference about 25%, this leads to a relatively low contrast, near 1.0. For SiO, the index of refraction ranges about 1.8 to 2.0 at 800 nm wavelength and reflectance minima in the 7 to 12% range yields contrasts of 2 to 4.

The thickness of the overcoat layer and the deposition method are dictated by consideration of the optical, mechanical, and thermal properties and economics. To meet the optical, antireflection-related requirements, the layer must be close to an odd multiple of an effective quarter-wave-optical-thickness at the read wavelength or a modification from this based on a compromise between the write and read wavelengths, if the two differ, or adjustments made to meet some other criterion. Assuming approximately normal angle of incidence of the read/write light, as is typical for tape systems, and an essentially opaque recording layer, the desired thicknesses are given by:

$$nt = \frac{\lambda}{4}\left(m - \frac{\delta}{180}\right)$$

where n=the overcoat index of refraction, t=the overcoat thickness, $\lambda$ the wavelength where minimum reflectance is desired (in the same units of measure as t), m is an odd integer, i.e. m=1,3,5,7, - - -, and $\delta$ the phase shift of light at the overcoat/alloy interface given by:

$$\delta = \tan^{-1}\left(\frac{2nk}{n_2 - n_2^2 - k_2^2}\right)$$

[Note: the above equations become substantially more complex in the real case of non-opaque recording layers and/or non-normal incident light, but the calculations are easily handled with appropriate computer programming and the effects on optimum film thicknesses are not great at most wavelengths.]

where $n_2$ and $k_2$ are the real and imaginary parts of the complex index of refraction of the metal represented as $N_2 = n_2 - ik_2$.

The desire for abrasion resistance will typically cause one to tend toward thicknesses where m=3,5,7. Thermal conductivity, deposition economics, stress limitations, and thickness control difficulty will cause one to tend toward a selection of m=1. We have further found that thick layers, e.g. m=3 and 5, have poor adhesion. Deposition economics will usually favor a coating process with high deposition rate, typically much higher than that of metal-oxide sputtering, such as vacuum evaporation, plasma enhanced CVD, or "solvent" coating.

In particularly preferred embodiments of the process of the invention, the deposition rate is above about 2500 Angstroms/sec.

Currently preferred is to vacuum evaporate a one quarterwave-optical-thickness layer, preferably in-line in the same coater as the metal layer is being deposited. Any stress the overcoat introduces into the tape package must be at a level compatible with the transport and the optical read/write systems to be employed.

The index of refraction greater than about 1.8 at about 800 nm wavelength for the silicon oxide overcoat layers of the invention can be achieved by evaporating in an environment such that the rate of depositing silicon oxide molecules is at least about 10 times that of arrival of background gas molecules at the deposition surface. Reference is made to "Stress in films of silicon monoxide"; Brit. J. Appl. Phys., 1967, vol 18, pgs 13–22.

The optical recording layer of the element of the invention is a SbInSn alloy of atomic composition within the ranges specified in U.S. Pat. No. 4,960,680. The currently preferred composition contains 70% Sb, 15% Sn, and 15% In. Coating of this layer can be by the methods described in the patents relating to this material and is preferrably accomplished by sputtering in a gas composed of primarily argon, with a doping of a small amount of $O_2$ as taught in U.S. Pat. No. 5,271,978.

The support for the element on which the recording and overcoat layers are coated is preferrably polyethylene terephthate (PET) or some similar, relatively thin, flexible plastic material. Other suitable flexible supports include polyethylene naphthalate (PEN); polyimide; polysulfone and laminates thereof. Reference is made, for example, to EP 0,585,710. The support may be provided with a suitable surface smoothing layer if necessary to meet the bit error requirements for specific applications. The support may also have back coats (coatings on the side opposite the recording layer) to improve the tape winding and handling or to improve the surface quality and decrease the raw bit error rate of the tape. Suitable back coats can be derived from a composition that includes a film forming water dispersable polymer, such as a polyester polyurethane, e.g. Witcobond™ 232; a non-film forming water dispersable filler such as carbon black; and a water dispersable lubricant such as carnauba wax. Back coats of this type are the invention of my coworkers, Lori J. Shaw-Klein and John B. Murphy.

The following examples are presented for a further understanding of the invention.

EXAMPLES

Optical tape elements according to this invention were prepared using a support material of 0.0005" (½ mil) (12.5 microns) thick poly (ethylene) terephthlate (PET). A recording layer was sputter coated to a thickness of 800 Angstroms from a target of 70% Sb, 15% Sn, 15% In an atmosphere of 4 mTorr (0.53Pa) of argon doped with 2 atom% $O_2$ with deposition rate about 350 Angstroms/sec (The $O_2$ doping was in the range shown useful in U.S. Pat. No. 5,271,978).

In the same coater in a deposition zone isolated from the sputtering zone various overcoat layers were coated on samples of the recording layer described above. In a typical preparations, a layer of silicon oxide monitored for antireflection at a predetermined minimum at a wavelength of about 800nm was evaporated over the alloy recording layer.

The results of testing examples of silicon oxide layers made under different conditions are found in Table 1. From this table one can see the variation of the critical properties, adhesion and curl. Relative deposit molecule to background gas molecule arrival rate ratio is the variable which determines the properties. It can be seen that index of refraction of the silicon oxide layer can be used to determine whether the desired overcoat has been achieved.

In the table, the deposit rate is given in Angstroms per second; the adhesion is ranked with 100 being no removal; for curl "-" indicates that the element was in tensile stress.

The adhesion test was the widely used adhesive tape test. In this test, a piece of adhesive tape is firmly applied to the sample and then rapidly removed with a snapping motion. The actual tapes use in the examples were Scotch™ Brand Magic Mending Tape, Scotch ™ Brand Pressure Sensitive Tape 610 and Scotch™ Brand Pressure Sensitive Tape 396. The score of "100" means that none of the tapes removed any of the coating. The other numbers are the average percent area under the tape where the layer was not removed for the three tapes used.

The curl is measured by cutting a piece of the sample cross web that is 12.5 cm long and 0.6 cm wide. The sample is placed on edge on a surface. The number measured is the cord depth in cm.

Abrasion resistance is a qualitative determination by an experienced observer following a single arm scratch test. A diamond stylus was used with varying load in a scratch tester commercially available from Tabor.

TABLE 1

| Silicon Oxide Overcoat Properties | | | | | | |
|---|---|---|---|---|---|---|
| Overcoat Material | Deposit Rate | $R_{min}$ (%) | Index of Refraction | Arrival rate Ratio $SiO_x$/Gas | Adhesion | Curl (in.) |
| $SiO_x$, good | 6,250 | 11.5 | 1.80 | 4,640 | 100 | −0.10 |
| $SiO_x$, good | 238 | 10.0 | 1.86 | 543 | 100 | −0.20 |
| $SiO_x$, good | 264 | 10.5 | 1.85 | 18 | 100 | 0.00 |
| $SiO_x$, good | 453 | 7.6 | 1.95 | 310 | 100 | 0.02 |
| $SiO_x$, good | 1,025 | 8.5 | 1.90 | 28 | 100 | −0.05 |
| $SiO_x$, good | 2,290 | 9.1 | 1.89 | 1,205 | 100 | −0.19 |
| $SiO_x$, good | 3,145 | 8.4 | 1.92 | 1,535 | 100 | −0.19 |
| $SiO_x$, good | 3,345 | 8.7 | 1.91 | 457 | 100 | −0.17 |
| $SiO_x$, fail | 265 | 15.8 | 1.69 | 6 | 0 | 0.45 |
| $SiO_x$, fail | 197 | 16.1 | 1.74 | 2 | 15 | 0.19 |
| $SiO_x$, fail | 521 | 18.4 | 1.63 | 3 | 15 | 0.48 |
| $SiO_x$, fail | 1,052 | 13.8 | 1.74 | 7 | 2 | 0.49 |
| $SiO_x$, fail | 4,655 | 15.2 | 1.71 | 13 | 82 | 0.00 |

Similar elements were made, but with other overcoat materials, e.g. $SiO_2$, $Al_2O_3$, or $TiO_2$, or very different silicon oxide overcoat thicknesses. The results of these are displayed in Table 2. Initial performance with respect to some of the materials was such that the materials were abandoned without completing the table entries.

TABLE 2

Some Properties of Various Overcoat Materials

| Overcoat | Sens.* $I_{th}$ (mw/μm²) | $R_{uw}$ (%) | Adhesion | Curl | Abrasion Resist. | Battelle Class II Test |
|---|---|---|---|---|---|---|
| SiO$_x$, 1/4λ | 13.2/8.0/4.9 | 11.5 | 100 | −0.20 | good | No change after 102 days |
| Comparative Examples | | | | | | |
| None | 14.3/8.1/5.0 | 54.0 | 100 | 0.00 | poor | Small spots after 30 days |
| SiO$_x$, 3/4λ | 17.2/9.5/6.0 | 8.6 | 0 | 0.64 | fair | not tested |
| SiO$_x$, 5/4λ | 18.8/10.5/6.5 | 10.0 | 0 | 0.91 | fair | not tested |
| SiO$_2$, 1/4λ | 17.9/9.8/5.9 | 32.0 | 100 | 0.00 | good | Stress buckles, 30 days |
| Al$_2$O$_3$, 1/4λ | 18.6/10.7/6.2 | 22.0 | 100 | distort. | good | Transparent after 30 days |
| TiO$_2$, 1/4λ | 14.6/7.9/4.6 | 4.0 | 100 | 0.18 | fair | Many spots after 30 days |

*sensitivities are for 25 nsec/50 nsec/100 nsec laser pulse lengths and are related to the power to write a spot by $P(l,NA,r,t) = (pl^2 I_{th}(t)/8NA^2) \exp(8NA^2 r^2/l^2)$, where l = the write wavelength, t = the pulse length, NA = the numerical aperture of the optics, and r = the radius of the spot to be written.

The invention has been described with particular reference to preferred embodiments thereof but it will be understood that modifications can be made within the spirit and scope of the invention.

We claim:

1. A flexible optical recording element comprising a flexible support having thereon, in order, an SbInSn phase-change alloy optical recording layer and an overcoat layer, the overcoat layer being a silicon oxide layer having an index of refraction greater than about 1.8 at about 800 nm wavelength and a thickness of about λ/4, where λ is the wavelength at which the element is read.

2. An optical recording element according to claim 1 wherein said index of refraction is greater than about 1.9 at about 800 nm wavelength.

3. An optical recording element according to claim 1 wherein said SbInSn phase-change alloy is doped with oxygen.

4. A method of making a flexible optical recording element comprising a flexible support having thereon, in order, an SbInSn phase-change alloy optical recording layer and an overcoat layer, the overcoat layer being a silicon oxide layer having an index of refraction greater than about 1.8 at about 800 nm wavelength and a thickness of about λ/4, where λ is the wavelength at which the element is read; said method comprising the step of:

providing said SbInSn phase-change alloy optical recording layer on said flexible support; and depositing said overcoat at an average deposition rate greater than about 2500 Angstroms/sec.

\* \* \* \* \*